United States Patent
Chen (10) Patent No.: US 8,842,237 B2
(45) Date of Patent: Sep. 23, 2014

(54) LIQUID CRYSTAL DISPLAY DEVICE

(71) Applicant: Innolux Corporation, Miao-Li County (TW)

(72) Inventor: Yen-Liang Chen, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 70 days.

(21) Appl. No.: 13/744,453

(22) Filed: Jan. 18, 2013

(65) Prior Publication Data
US 2013/0201427 A1    Aug. 8, 2013

(30) Foreign Application Priority Data

Feb. 6, 2012 (TW) ............... 101103821 A (51) Int. Cl.
*G02F 1/1335* (2006.01)
*F21V 7/04* (2006.01)
*G02B 27/26* (2006.01)
*G02B 27/22* (2006.01)

(52) U.S. Cl.
CPC ............ *G02F 1/13362* (2013.01); *G02B 27/26* (2013.01); *G02B 27/2214* (2013.01)
USPC ................... 349/61; 349/62; 349/65; 349/96; 349/117; 362/606; 362/616; 362/617

(58) Field of Classification Search
CPC ............ G02F 1/1336; G02F 1/133602; G02F 1/13362; G02F 1/133613; G02F 1/13363; G02B 27/26; G02B 6/0076
USPC ................... 349/61–62, 65, 96, 117; 362/606, 362/616–617
See application file for complete search history.

(56) References Cited

U.S. PATENT DOCUMENTS

| | | | |
|---|---|---|---|
| 2008/0112187 A1* | 5/2008 | Katsumata et al. ........... | 362/611 |
| 2008/0204631 A1* | 8/2008 | Takada ........................... | 349/65 |
| 2009/0067156 A1* | 3/2009 | Bonnett et al. ................ | 362/97.2 |
| 2010/0302798 A1* | 12/2010 | Papakonstantinou et al. ............................. | 362/601 |

* cited by examiner

Primary Examiner — Nathanael R Briggs
(74) Attorney, Agent, or Firm — McClure, Qualey & Rodack, LLP (57) ABSTRACT

A liquid crystal display device includes a liquid crystal display panel, a first back light module (BLU), a polarizer, a second BLU and a pattern retarder. The first BLU is disposed below the liquid crystal display panel for emitting light. The polarizer is disposed on the first BLU, to convert the light into a first light. The second BLU is disposed between the liquid crystal display panel and the first BLU for emitting a second light. The pattern retarder is disposed between the liquid crystal display panel and the first BLU. The pattern retarder includes plural first and second polarizing regions with orthogonal polarization states, and the first and second polarizing regions are arranged in an interlaced order. Also, the polarization state of the first light is orthogonal to the polarization state of the second polarizing region.

18 Claims, 6 Drawing Sheets

LIQUID CRYSTAL DISPLAY DEVICE

This application claims the benefit of Taiwan application Serial No. 101103821, filed Feb. 6, 2012, the subject matter of which is incorporated herein by reference.

BACKGROUND

1. Technical Field

The disclosed embodiments relate in general to a liquid crystal display device, and more particularly to a liquid crystal display device with switchable two-dimensional (2D) and three-dimensional (3D) display modes.

2. Description of the Related Art

Displays such as liquid crystal displays (LCDs) have been developed to provide three-dimensional (3D) displays in various forms and ranging from experimental displays in university departments to commercial products. Currently, most of 3D displays require the use of special headgear or glasses on the part of the viewer. Due to inconveniency of the use of headgear or glasses, many manufacturers have been studied and advanced towards the technology of autostereoscopic display.

Autostereoscopic displays, also known as "Naked eye 3D display", are able to provide binocular depth perception without the hindrance of specialized headgear or filter/shutter glasses. Naked eye 3D displays have been demonstrated using a range of optical elements in combination with an LCD including parallax barrier technology and lenticular optic technology to provide stereoscopic vision. LCD including parallax barrier technology is taken for illustration as below.

Figure 1A:
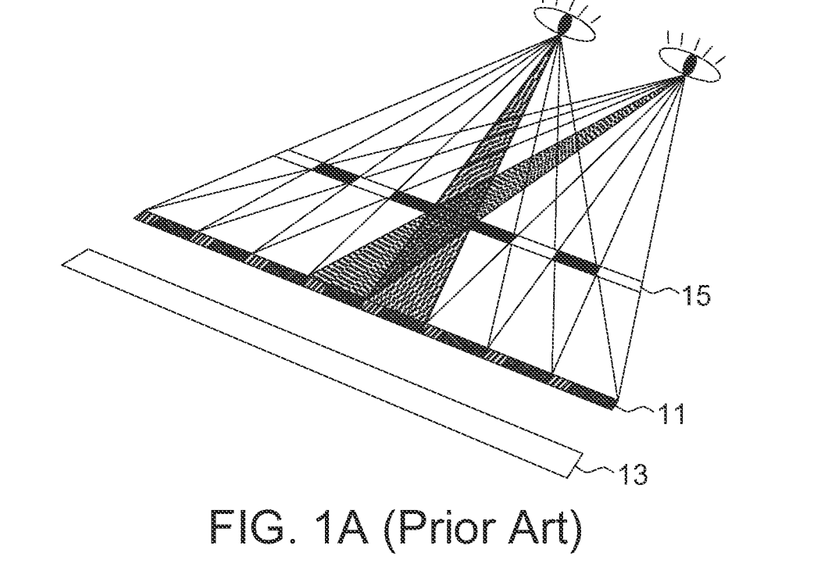
FIG. 1A (prior art) is one of conventional 3D displays with parallax barrier.

Generally, the parallax barrier has optical apertures aligned with columns of LCD pixels. A parallax barrier could be a sheet or an electro optic panel with fine slits to separate the light pathway of spatial images into images for left eye and right eye, and this reconstructed scene of the left eye image and right eye image is perceived as 3D images by the observer. FIG. 1A is one of conventional 3D displays with parallax barrier. A parallax barrier 15 is positioned in front of a display panel 11, and set between human eyes and the display panel 11. The backlight module 13 emits light. The parallax barrier 15 with transparent and opaque strips limits the pixels only radiate light in directions seen by the left eye or right eye. In the accurate alignment between the backlight module 13 and the display panel 11, the left eye and the right eye of the observer would receive images on the odd numbered pixels and even numbered pixels, respectively. When different images are displayed on the odd numbered pixels and even numbered pixels of the display panel 11 and received by the left eye and the right eye correspondingly, it is capable of conveying depth perception to the viewer and providing stereoscopic vision by fooling the human brain.

Figure 1B:
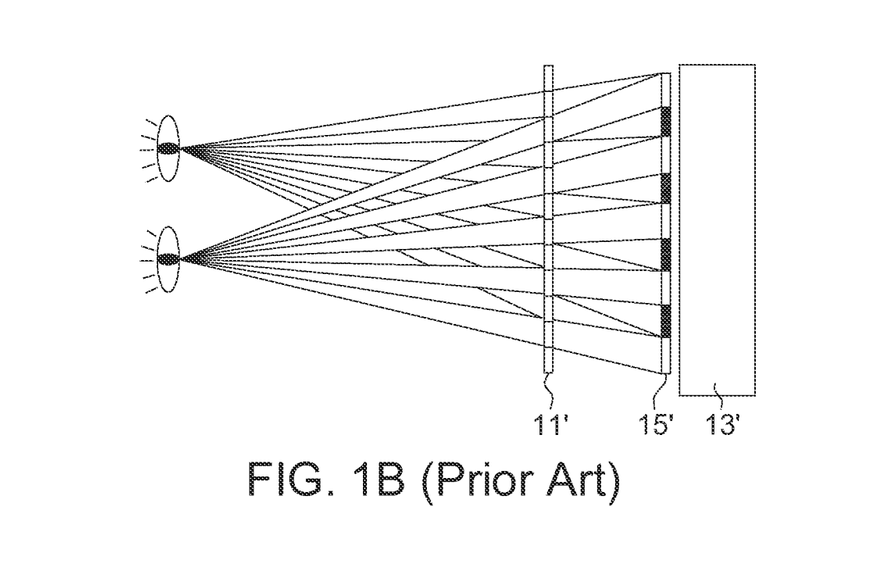
FIG. 1B (prior art) is another conventional 3D display with parallax barrier.

FIG. 1B is another conventional 3D display device with parallax barrier. In FIG. 1B, the parallax barrier 15' is positioned behind the display panel 11, and set between the backlight module 13' and the display panel 11'. The transparent and opaque strips of the parallax barrier 15' are still able to partially block the light emitted from the backlight module 13', and only transparent strips of the parallax barrier 15' allow penetration of light, thereby achieving the naked eye 3D displaying effect.

Generally, the naked eye 3D display device possesses 2D/3D switchable function. To switch the 2D display mode and 3D display mode of display device, the pattern of transparent and opaque interlaced strips of the parallax barrier 15 or 15' as shown in FIG. 1A or FIG. 1B has to be disappeared. Most of the 2D/3D switchable 3D displays adopt electro optic panel with fine and vertical stripes as a barrier module. When the display device is in 2D display mode, the barrier module is turned off to allow the full penetration of the light from the backlight module. When the display device is in 3D display mode, the barrier module reveals the pattern of transparent and opaque interlaced strips. However, this naked eye 3D display device requires two display panels, which is bulky and expensive.

SUMMARY

The disclosure is directed to a liquid crystal display device with switchable two-dimensional (2D) and three-dimensional (3D) display modes. The liquid crystal display device of the embodiment adopts two sets of back light modules (BLUs), to provide the light for the display panel in the 2D and 3D display modes. The liquid crystal display device of the embodiment not only provides the 2D display mode and the naked 3D display mode, but also decreases the fabrication cost compared to the conventional design with two display panels.

According to the embodiment, a liquid crystal display device is provided, comprising a liquid crystal display panel, a first back light module (BLU), a second BLU, a polarizer and a pattern retarder. The first BLU is disposed below the liquid crystal display panel to emit light (for the LCD in 3D display mode). The polarizer is disposed on the first BLU, to convert the light from the first BLU into a first light. The second BLU is disposed between the liquid crystal display panel and the first BLU to emit light (for the LCD in 2D display mode). The pattern retarder is disposed between the liquid crystal display panel and the first BLU, and comprises a plurality of first polarizing regions and a plurality of second polarizing regions arranged in an interlaced order, wherein the polarization state of the first polarizing region is orthogonal to a polarization state of the second polarizing region.

In the 3D display mode, the first BLU is turned on and the second BLU is turned off. The first light passes the second BLU and reaches the pattern retarder. Since the polarization state of the first light is parallel to the polarization states of the first polarizing regions, part of the first light penetrates the first polarizing regions to radiate the corresponding pixels of the liquid crystal display panel.

In the 2D display mode, the second BLU is turned on and the first second BLU is turned off. The second light from the second BLU passes all of the first polarizing regions and the second polarizing regions of the pattern retarder.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The embodiment provides a liquid crystal display device adopting two sets of back light modules (BLUs), to possess the function of switchable two-dimensional (2D) and three-dimensional (3D) display modes. Compared to the conventional design of two display panels, the cost of the liquid crystal display device of the embodiment is decreased (i.e. addition of one BLU is less expensive than one display panel). The embodiments are described in details with reference to the accompanying drawings. The details of the embodiment are provided for illustration, not intended to limit the display device of the present disclosure. Also, it is also important to point out that the illustrations may not be necessarily be drawn to scale, and that there may be other embodiments of the present disclosure which are not specifically illustrated. Thus, the specification and the drawings are to be regard as an illustrative sense rather than a restrictive sense.

Figure 2:
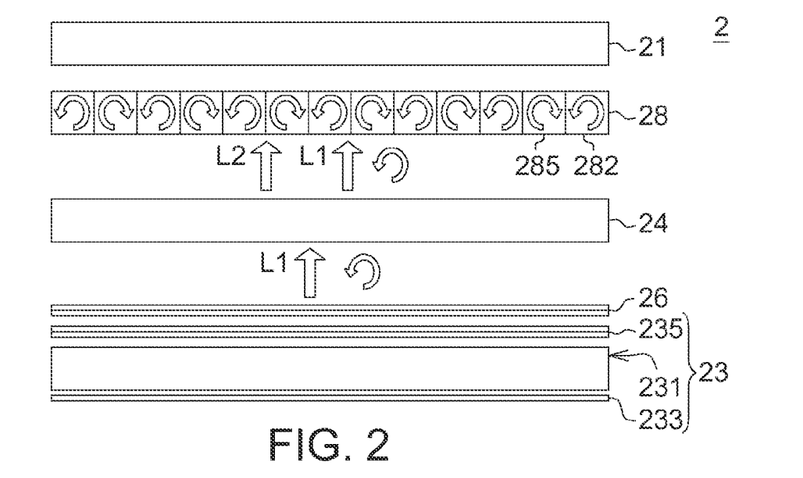
FIG. 2 illustrates a liquid crystal display device according to an embodiment of the present disclosure.

FIG. 2 illustrates a liquid crystal display device according to an embodiment of the present disclosure. The liquid crystal display device 2 includes a liquid crystal display panel 21, a first back light module (BLU) 23, a second BLU 24, a polarizer 26 and a pattern retarder 28. The first BLU 23 is disposed below the liquid crystal display panel 21, to emit light for the liquid crystal display device 2 in 3D display mode. The second BLU 24 is disposed between the liquid crystal display panel 21 and the first BLU 23, to emit light for the liquid crystal display device 2 in 2D display mode. The polarizer 26 is disposed on the first BLU 23. When the light emitted from the first BLU 23 passes through the polarizer 26, it is converted into a first light L1 with a first polarization state, such as a linearly polarized light, a left-hand circularly polarized light or right-hand circularly polarized light.

The first BLU 23 could be direct-type or edge-type. For example, the first BLU 23 includes a first light guide plate 231, a light source (not shown) disposed at lateral side of the first light guide plate 231, a reflective plate 233 under the first light guide plate 231, and several optical sheets 235 such as brightness enhancement films and diffusion sheets on the first light guide plate 231. Additionally, the polarizer 26 disposed on the optical sheets 235 is selected from single material or a combination of multi-layered materials capable of changing the polarization state of the light passing through. Examples of the polarizer 26 include a linear polarizer, a quarter-wave (¼λ) retardation plate, a ½λ retardation plate, a reflective polarizer (such as dual brightness enhancement film, DBEF) and a combination thereof. Therefore, the polarizer 26 converts the light from the first BLU 23 into a polarized light (i.e. the first light L1 with the first polarization state). In the embodiment, the polarizer 26 comprises a quarter-wave (¼λ) retardation plate, so that the first light L1 from the first BLU 23 is a circularly polarized light.

Figure 3:
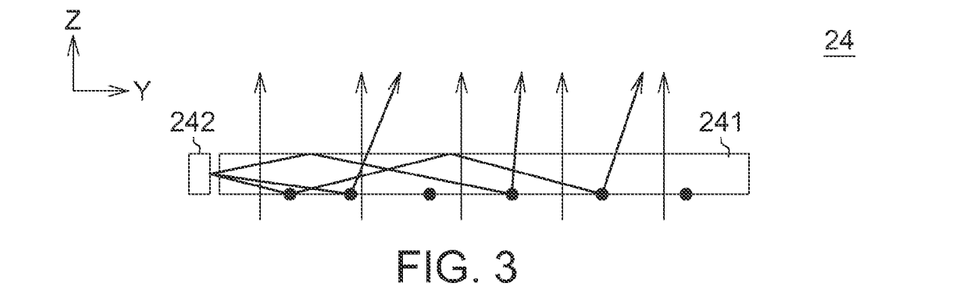
FIG. 3 illustrates the second BLU of the liquid crystal display device according to the embodiment of the present disclosure.

FIG. 3 illustrates the second BLU of the liquid crystal display device according to the embodiment of the present disclosure. The second BLU 24, disposed between the liquid crystal display panel 21 and the first BLU 23, includes a second light guide plate 241 and a second light source 242, wherein the second light source 242 is disposed at lateral side of the second light guide plate 241. The second light L2 emitted from the second BLU 24 is an unpolarized light. In the embodiment, the second BLU 24 is designed to maintain the polarization state of the first light L1 as unchanged as possible. No reflective plate or optical sheet is disposed below or on the second light guide plate 241, to prevent from changing the light path or the polarization state of the first light L1 which would decrease the quality of 3D display. However, no reflective plate or optical sheet disposed below or on the second light guide plate 241 would cause insufficient brightness of 2D display. In the embodiment, the second light guide plate 241 of the second BLU 24 is designed with extra structures to control the emergence angle of the light. It is preferably, but not limitedly, that the light exiting from the second light guide plate 241 is almost orthogonal to the bottom surface of the second light guide plate 241, thereby acquiring sufficient brightness of 2D display. As shown in FIG. 3, several white colored patterns could be arranged on the bottom surface of the second light guide plate 241 as a matrix to reflect the lateral light from the second light source 242 toward the normal direction. This design has less effect on the 3D display.

The pattern retarder 28 is disposed between the liquid crystal display panel 21 and the first BLU 23, to be a functional device of 3D display. As shown in FIG. 2, the pattern retarder 28 could be disposed between the liquid crystal display panel 21 and the second BLU 24, and could be attached to the bottom of the liquid crystal display panel 21 by an adhesive. The pattern retarder 28 comprises a plurality of first polarizing regions 282 and a plurality of second polarizing regions 285 arranged in an interlaced order, and a polarization state of the first polarizing region 282 is substantially orthogonal to a polarization state of the second polarizing region 285. In other words, the inner product of polarization states of the first polarizing region 282 and the second polarizing region 285 is 0. The first polarizing regions 282 and the second polarizing regions 285 are positioned correspondingly to the pixel regions of the liquid crystal display panel 21.

In one embodiment, the polarization states of the first polarizing regions 282 and the second polarizing regions 285 could be 45 degree and 135 degree of linear polarizations, or left-hand and right-hand circular polarizations, respectively. Also, a polarization state of the first light L1 emitted from the first BLU 23 is substantially orthogonal to one of the polarization states of the first polarizing regions 282 and the second polarizing regions 285, and substantially parallel to the other thereof. In another embodiment, the polarization states of the first polarizing regions 282 and the second polarizing regions 285 could be a combination of non-polarization and polarization, wherein the polarization states of the polarized regions are substantially orthogonal to that of the first light L1. As shown in FIG. 2, the pattern retarder 28 adopts a combination of left-hand and right-hand circular polarizations.

Figure 4A:
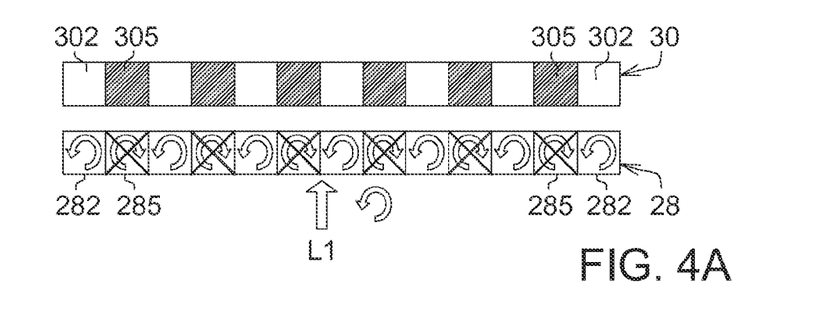
FIG. 4A illustrates the relationship between the first light and the pattern retarder when the first BLU being turned on in 3D display mode of the liquid crystal display device according to the embodiment of the present disclosure.

According to the embodiment, two sets of BLUs are not activated simultaneously. FIG. 4A illustrates the relationship between the first light and the pattern retarder when the first BLU being turned on in 3D display mode of the liquid crystal display device according to the embodiment of the present disclosure. Please refer to FIG. 2 and FIG. 4A. In 3D display mode, the first BLU 23 is turned on and the first light L1 from the first BLU 23 is a right-hand circularly polarized light, and then passes the second BLU 24 and reaches the pattern retarder 28 without changing its polarization state. The first polarizing regions 282 and the second polarizing regions 285 are right-hand and left-hand circular polarizations, respectively. Since the polarization state of the first light L1 is parallel to the polarization states of the first polarizing regions 282, part of the first light L1 penetrates the first polarizing regions 282 to radiate the corresponding pixels of the liquid crystal display panel 21. Therefore, those first polarizing regions 282 function as the transparent regions 302. Since the polarization state of the first light L1 is orthogonal to the polarization states of the second polarizing regions 285, part of the first light L1 would be absorbed or reflected by the material of the second polarizing regions 285 (ex: absorbed by the typical material of linear polarization, or reflected by the reflective material of the polarized film) which can not radiate the corresponding pixels of the liquid crystal display panel 21. Therefore, those second polarizing regions 285 function as the opaque (black) regions 305.

Accordingly, when the display device is in 3D display mode, the embodiment achieves the result of the parallax barrier 30 after the first light L1 passes the pattern retarder 28. The transparent regions 302 and the opaque regions 305 interlaced in an order separate the light pathway of spatial images into images for left eye and right eye, and this reconstructed scene of the left eye image and right eye image is perceived as 3D images by the observer.

Figure 4B:
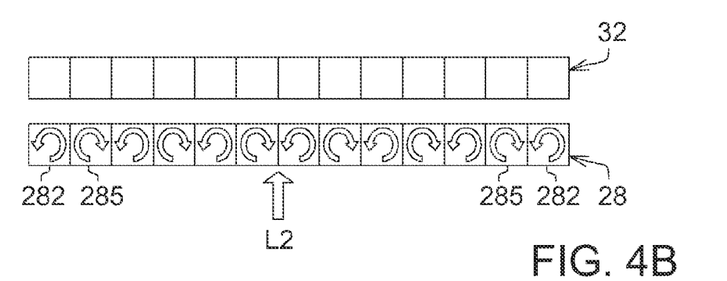
FIG. 4B illustrates the relationship between the second light and the pattern retarder when the second BLU being turned on in 2D display mode of the liquid crystal display device according to the embodiment of the present disclosure.

FIG. 4B illustrates the relationship between the second light and the pattern retarder when the second BLU being turned on in 2D display mode of the liquid crystal display device according to the embodiment of the present disclosure. Please refer to FIG. 2 and FIG. 4B. In 2D display mode, the second BLU 24 is turned on and the first BLU 23 is turned off. The second light L2 from the second BLU 24 is a non-polarized light, which is able to pass all of the first polarizing regions 282 and the second polarizing regions 285 of the pattern retarder 28. In this situation, the pattern retarder 28 functions as a transparent plate 32 as shown in FIG. 4B, and provides no effect of parallax barrier.

<Design of Second BLU>

As aforementioned before, it is desirable to maintain the polarization state of the first light L1 from the first BLU 23 in 3D display mode and also direct the light from the second BLU 24 to the normal direction with sufficient brightness, some designs of the second light guiding plate 241 according to the embodiments are disclosed below for demonstrations.

Figure 5:
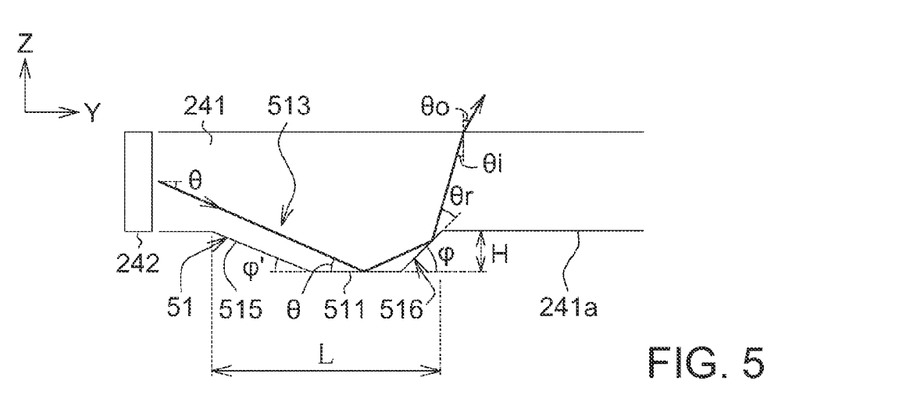
FIG. 5 illustrates a cell configuration of a second light guiding plate of the second BLU according to the embodiment of the present disclosure.

FIG. 5 illustrates a cell configuration of a second light guiding plate of the second BLU according to the embodiment of the present disclosure. FIG. 5 lies in a Y-Z plane. A plurality of cell configurations 51 are distributed on a bottom surface 241a of the second light guide plate 241, and each of the cell configurations 51 is reversely trapezoidal-shaped, as shown in FIG. 5. The cell configuration 51 has a bottom portion 511, an opening portion 513, a first slanted surface 515 and a second slanted surface 516 connected to the bottom portion 511 and the opening portion 513. The second slanted surface 516 is farther from the second light source 242 than the first slanted surface 515, and the opening portion 513 joins the bottom surface 241a of the second light guide plate 241.

The main parameters of the cell configuration 51 include H, L and $\phi$. A vertical distance from the bottom portion 511 to the opening portion 513 is defined as a depth H of the cell configuration 51. The opening portion 513 has a length L along a propagation direction of the second light L2. An exterior angle of the second slanted surface 516 is defined as a structural angle $\phi$. The reference parameters include an incident angle $\theta$ of the light from the second light source 242, a reflective structural angle $\theta r$, a structural emergence angle $\theta i$ and an emergence angle $\theta o$ of the second light guide plate 241. The cell configurations 51 are designed to create twice reflections of the incident light from the second light source 24 by means of the bottom portion 511 and the slanted surface (i.e. the second slanted surface 516) of the reversely trapezoidal-shape cell configuration 51. When the light from the second light source 24 enters the cell configuration 51, it is reflected by the bottom portion 511 and followed by the second slanted surface 516, and then exit toward the position of the liquid crystal display panel 21. It is preferably, but not limitedly, that the emergence angle $\theta o$ (i.e. the light exiting from the second light guide plate 241) is almost orthogonal to the bottom surface of the second light guide plate 241 by the optimization of main parameters.

In the embodiment, the cell configurations 51 could have identical, partially identical or completely different structural angles $\phi$.

If the incident light from the second light source 24 is not reflected by the slanted surface (i.e. the second slanted surface 516) of the reversely trapezoidal-shape cell configuration 51, it would be propagate mostly parallel to the incident angle $\theta$ within the second light guide plate 241, until reach another cell configuration 51 to reflect twice and acquire the emergence angle $\theta o$ almost vertical to the second light guide plate 241.

Figure 6:
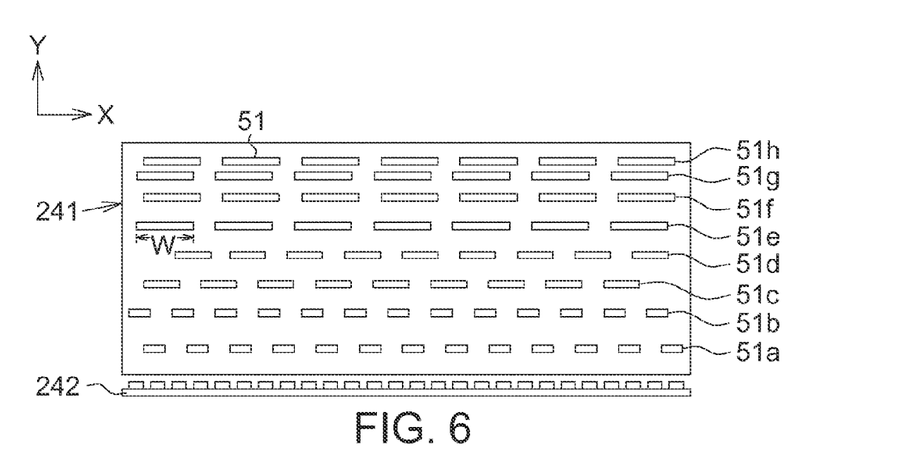
FIG. 6 is a top view of the cell configuration of the second BLU according to the embodiment of the present disclosure.

For increasing the possibility of emergent light from the cell configurations 51 after twice reflection of light, the widths W, the density and arrangement of the distribution of the cell configurations 51 could be modifying to optimize the light extraction efficiency of the second BLU 24. FIG. 6 is a top view of the cell configuration of the second BLU according to the embodiment of the present disclosure. FIG. 6 lies in an X-Y plane. The cell configuration 51a-51h distributed on the bottom surface 241a of the second light guide plate 241 could be arranged in an order from sparse to dense in accordance of distances to the second light source 242. Additionally, the cell configurations 51a-51h closer to the second light source 242 could be smaller in width, while the cell configurations farther from the second light source 242 could be larger in width. Also, the cell configurations 51a-51h could be orderly or randomly distributed on the bottom surface 241a of the second light guide plate 241, such as being arranged in a staggered order or a matrix form.

Figure 7:
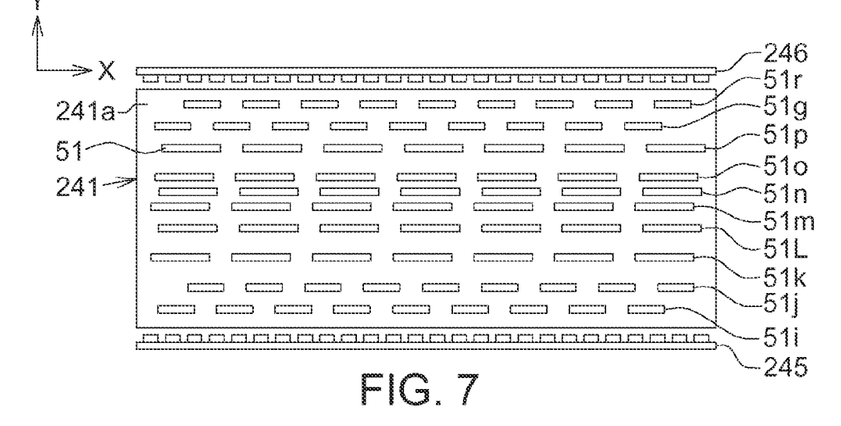
FIG. 7 is a top view of the cell configuration of the second BLU according to another embodiment of the present disclosure.

Although one light source of the second BLU 24 is taken for illustration above, the disclosure is not limited thereto. The second BLU of the embodiment could comprise two of the second light sources disposed at different lateral sides of the second light guide plate. FIG. 7 is a top view of the cell configuration of the second BLU according to another embodiment of the present disclosure. As shown in FIG. 7, two of the second light sources 245 and 246 are disposed at two opposite lateral sides of the second light guide plate 241. The cell configurations 51i-51m distributed on the bottom surface 241a of the second light guide plate 241 are arranged in an order from sparse to dense in accordance of distances to the second light source 245. Similarly, the cell configurations 51r-51n distributed on the bottom surface 241a of the second light guide plate 241 are arranged in an order from sparse to dense in accordance of distances to the second light source 246. Also, the cell configurations closer to the second light sources 245 and 246 are smaller in width, while the cell configurations farther from the second light sources 245 and 246 are larger in width.

Figure 8:
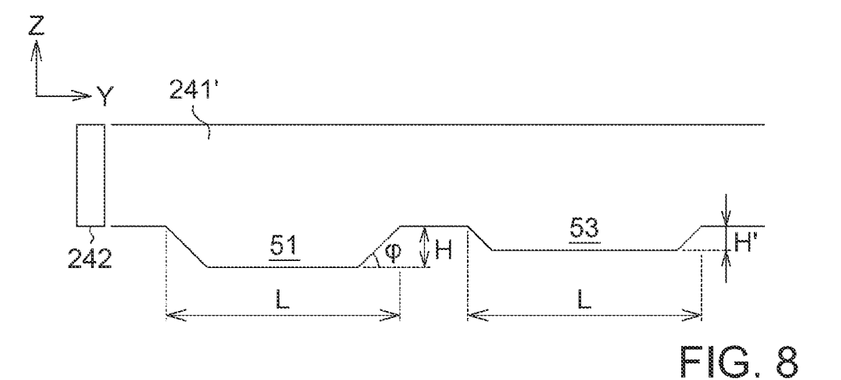
FIG. 8 illustrates the cell configurations of the second BLU according to another embodiment of the present disclosure.

Additionally, the cell configurations on the second light guide plate 241 are not limited to the identical design parameters. The rations of H/L of the cell configurations 51 could be the same or different. FIG. 8 illustrates the cell configurations of the second BLU according to another embodiment of the present disclosure. Since the light incident in the lateral side of the second light guide plate 241 is in a wider range, the cell configuration 51 closer to the incidence surface of the second light sources 242 adopts the higher ratio of H/L to control the light extraction efficiency, while the cell configuration 51 father to the incidence surface of the second light sources 242 adopts the smaller ratio of H/L (ex: H'<H at fixed value of L). For the light with smaller incident angle θ, the light extraction efficiency of the second BLU 24 could be increased by setting the cell configurations 51 with H/L ratios in a staggered order.

Figure 9:
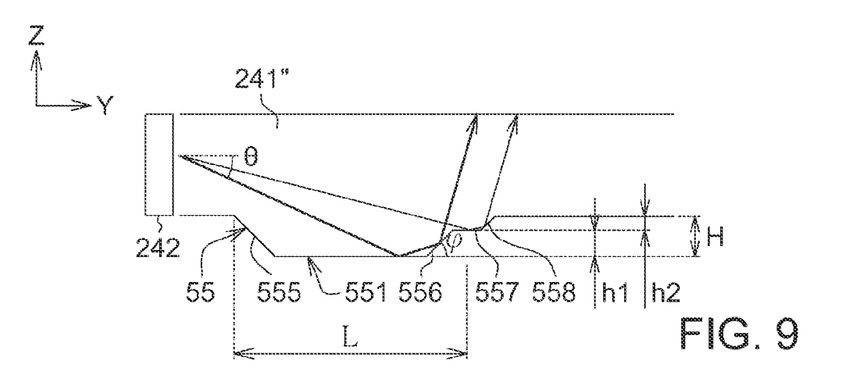
FIG. 9 illustrates the cell configurations of the second BLU according to a further embodiment of the present disclosure.

Also, the cell configuration 51 could be further modified. For example, the cell configuration 51 could have a slant surface including at least one ladder or other ladder-shaped design, or is a cylinder or gengon viewed on the top of the second light guide plate 241, thereby helping to extract energy of the light with small incident angle, adjust the sizes and distributions of the cell configuration 51 in a simpler way, or facilitating the fabrication. FIG. 9 illustrates the cell configurations of the second BLU according to a further embodiment of the present disclosure. As shown in FIG. 9, the cell configuration 55 has a first bottom portion 551, a first slanted surface 555, a second bottom portion 557 and a second slanted surface 556. The light could be reflected twice by the first bottom portion 551 and the first slanted surface 555, or could be reflected twice by the second bottom portion 557 and the second slanted surface 556. In this design, each cell configuration has couple of units for creating twice reflection. For example, the cell configuration 55 has two units, including the first unit composed of the first bottom portion 551 and the first slanted surface 555, and the second unit composed of the second bottom portion 557 and the second slanted surface 556. The first unit has a depth h1, and the second unit has a depth h2. H=h1+h2.

Additionally, the cell configurations 51 could be formed by printing, ink-jet printing, injection, roller pressing, mechanical or laser machining, or other suitable fabrications. Moreover, the corners of the cell configuration 51 could be formed as round corners or sharp corners, and could be formed with acute angles or chamfer angles, in the precondition of no effect on the twice reflection of the light within the cell configuration. In one embodiment, an exterior angle of the corner of the cell configuration 51 is an acute angle.

It is known by the people skilled in the art that the cell configuration designs described in details with reference to the accompanying drawings are provided for illustration, not intended to limit the present disclosure. The modifications and variations of design parameters would be made to meet the requirements of the practical applications without departing from the spirit of the disclosure.

<Design Parameters of Cell Configuration 51>

Please refer to FIG. 5. The main parameters of the cell configuration 51 include H, L and φ.

Depth H: a vertical distance from the bottom portion 511 to the opening portion 513.

Length L: a length of the opening portion 513 along a propagation direction of the light.

θ: an incident angle of the light.

Structural angle φ: an exterior angle of the second slanted surface 516.

The reference parameters include an incident angle θ of the light from the second light source 242, a reflective structural angle θr, a structural emergence angle θi, and an emergence angle θo of the second light guide plate 241. To achieve the twice reflections of the incident light by means of the bottom portion 511 and the slanted surface (i.e. the second slanted surface 516), the design parameters are optimized to acquire the emergence angle θo as close to 90 degree as possible (i.e. the emergence light being vertical to second light guide plate 241).

In the calculation, $$\phi = \theta + \theta_r => \theta_r = \phi - \theta$$

$$\theta_i = 90 - \phi - \theta_r => \theta_i = 90 + \theta - 2\phi$$

$$\sin\theta_i \times n_i = \sin\theta_o \times n_o$$

If θi is closer to 0 degree, θo is also closer to 0 degree. The light can not exit from the cell configuration, if the equation $$\theta < \tan^{-1}\left(\frac{H}{L - H \times \cot\phi}\right)$$

is satisfied.

Therefore, when the equation $$\theta \geq \tan^{-1}\left(\frac{H}{L - H \times \cot\phi}\right)$$

is satisfied, the second light L2 is able to exit from the second light guide plate 241.

Figure 10:
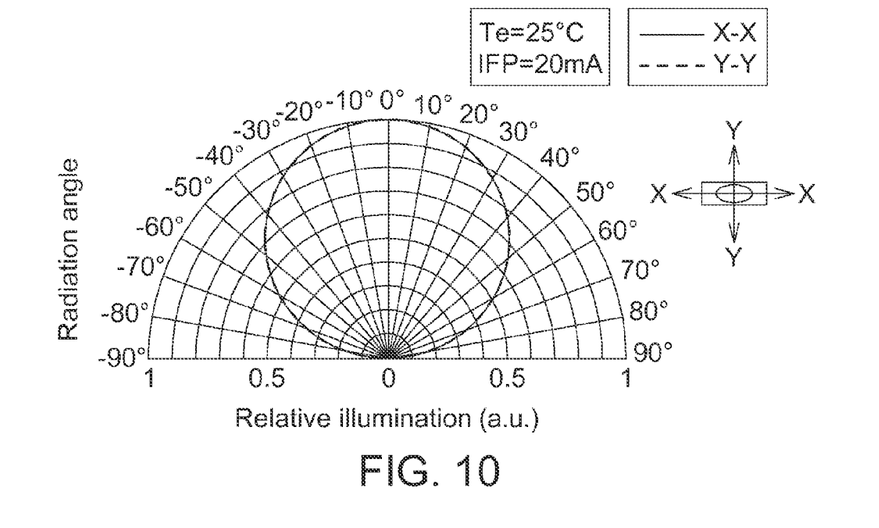
FIG. 10 shows the emitting angles of a Lambertian light emitting diode.

It is assumed that the light source is a Lambertian light emitting diode. A diffuse reflection, sometimes called Lambertian scattering or diffusion, occurs when a rough or matte surface reflects the light at many different angles. FIG. 10 shows the emitting angles of a Lambertian light emitting diode. The Lambertian light source (/surface) emits (/reflects) equal (isotropic) luminance in every direction. Notice that the Lambertian reflection follows the cosine law, which the amount of reflected energy in a particular direction (the intensity) is proportional to the cosine of the reflected angle. According to the reflection law, the incident angle θ of the light entering the second light guide plate 241 is mainly in a range of 0 degree to 42 degree. Also, it is assumed that the second light guide plate 241 is made of PMMA, which has a reflective index of 1.49 and a critical angle of total reflection is 42.2 degree. The calculations of θi and θo are conducted in a range of 0°≤θ≤42°.

Some parameters of the cell configuration could be studied further based on the descriptions above.

1. Relationship Between Length L and Depth H

According to the aforementioned discussion, the light with the incident angle θ satisfied the equation of $$\theta < \tan^{-1}\left(\frac{H}{L - H \times \cot\phi}\right)$$

can not exit from the cell configuration. Thus, the smaller the value of H/L is, the less the light energy loses. However, the light extraction energy is related to the value of H/L. The light extraction energy of each cell configuration 51 would be lower if the value of H/L is smaller. In one example, a ratio of H/L is in a range of 0.05 to 0.2. In another example, a ratio of H/L is in a range of 0.1 to 0.15, wherein the length of L is such as 100 um, and the depth of H is such as 10~15 um, approximately.

2. Study of Structural Angle $\phi$

Subsequent to the discussion of relationship between L and H, change of the structural angle $\phi$ would also have effect on the value of $$\tan^{-1}\left(\frac{H}{L - H \times \cot\phi}\right)$$

when the cell configuration has a fixed value of H/L.

Figure 11:
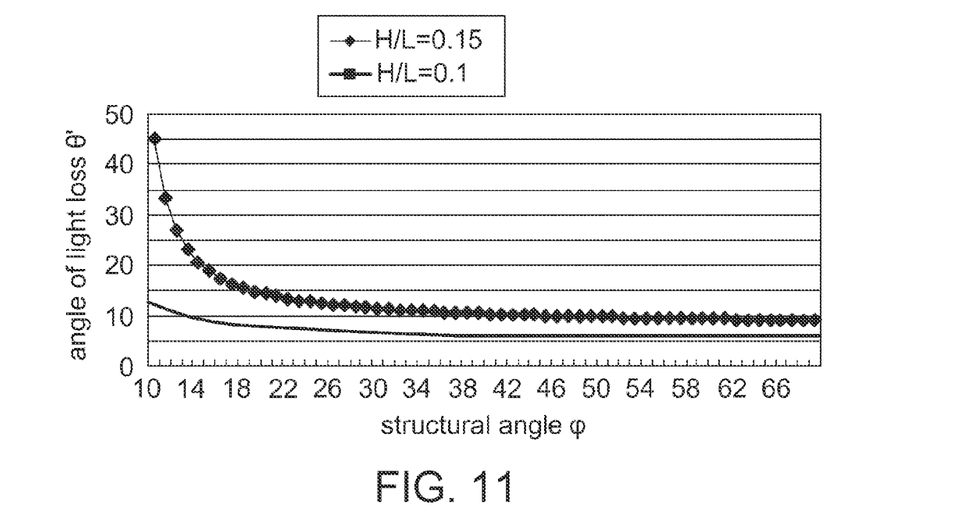
FIG. 11 shows the relationship of the angles of light loss ($\theta'$) of at different structural angles ($\phi$) when the cell configuration has a fixed value 0.1 and 0.15 of H/L.

FIG. 11 shows the relationship of the angles of light loss ($\theta'$) of at different structural angles ($\phi$) when the cell configuration has a fixed value 0.1 and 0.15 of H/L. It is indicated in FIG. 11 that the structural angle $\phi$ less than 30 degree would cause a wider angle range that loses the light.

Additionally, the structural emergence angle $\theta_i$ has to be considered in the conceiving the structural angle $\phi$. The equation of $\theta_i=90+\theta-2\phi$ clearly shows that the incident angle $\theta$ and the structural angle $\phi$ are main parameters. Also, it is desirable that the light with the incident angles $\theta$ less than 42° could be extracted from the cell configuration as much as possible.

In one example, it is assumed that the cell configuration has a fixed value 0.15 of H/L. If the structural angle $\phi$ is about 30 degree, the light cannot be reflected and exited from the cell configuration except the light with incident angles $\theta$ of 11°~13°, approximately. If the structural angle $\phi$ is about 50 degree, the light with incident angles $\theta$ of 10°~42° could be reflected and exited from the cell configuration, and the light with incident angle $\theta$ of 10° can be vertically exited after twice reflection within the cell configuration.

In another example, if the cell configuration has a fixed value 0.10 of H/L and a structural angle $\phi$ of 48°, the calculation results show that the light energy extracted from the cell configuration would be the light with incident angles $\theta$ of 6.5°~35.5° after twice reflection.

3. Some Optimized Results for Main Parameters of Cell Design

It is also tried to obtain some optimized structural angles $\phi$ by selecting the ratio of H/L as variable, so that the incident light into the cell configuration 51 can be reflected twice and exited with optimized emergence angle. Some of results are listed below.

| H/L | Structural Angle $\phi$ | Range of Incident Angles $\theta$ | Range of Emergence Angle $\theta°$ |
| --- | --- | --- | --- |
| 0.05 | 46.55° | 3.1°~42° | 0°~69.3° |
| 0.1 | 48.15° | 6.3°~42° | 0°~60.4° |
| 0.15 | 49.9° | 9.8°~42° | 0°~52.6° |
| 0.2 | 51.7° | 13.4°~42° | 0°~45.5° |

(Those data are obtained by simulating two lateral light sources for the light guiding plate, and the calculation is also based on the requirement of the strongest light being normal (0°) to the front side of the light guiding plate.)

The optimized value of H/L cannot be determined without introducing the design of the second BLU (ex: the length and width of the second light guide plate 241, the distribution of cell configurations 51, . . . etc.). In one embodiment, the ratio of H/L of the cell configuration would be less than 0.2 to prevent an over-wide angle range that loses the light.

4. Condition of the Light Failing to Exit after Twice Reflection in the Cell Configuration (with One Bottom Portion and One Slant Surface for Performing Twice Reflection)

Figure 12:
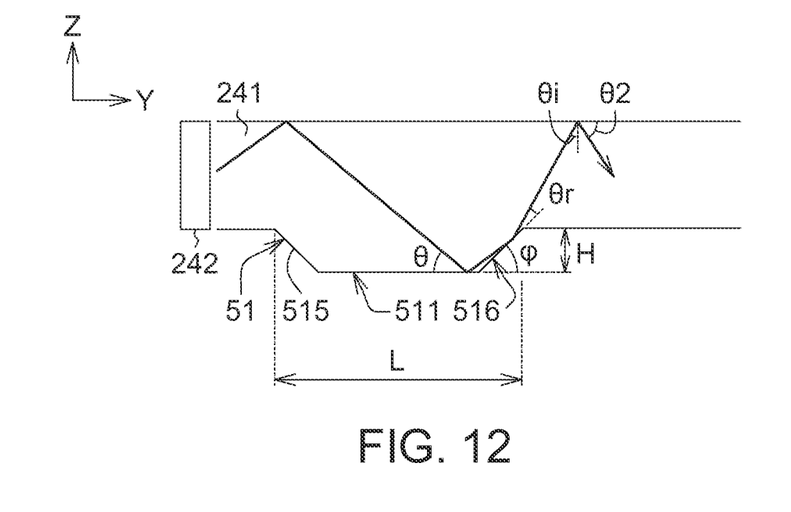
FIG. 12 illustrates the light in the second light guide plate of the second BLU of FIG. 5 failing to exit after twice reflection.

FIG. 12 illustrates the light in the second light guide plate of the second BLU of FIG. 5 failing to exit after twice reflection. As shown in FIG. 12, the incident light from the second light source 242 enters the second light guide plate 241 and reflected twice in the cell configuration 51 (by the bottom portion 511 and the second slant surface 516), and then reflected by the output surface of the second light guide plate 241 because of failing to reach the emergence angle. It means that the equation of $\theta_i=90+\theta-2\phi>42.2°$ is satisfied.

Consequently, the equation of $2\phi-\theta<47.8°$ is obtained. Thus, the re-incident angle $\theta_2$ satisfies the equation of $\theta_2=2\phi-\theta<47.8°$.

(1) Accordingly, the possible re-emergence angle $\theta_{i2}$ is presented as the equation of $\theta_{i2}=90+\theta_2-2\phi=90-\theta$. However, one of limitation for the light into the reflective zone is to limit the incident angle $\theta$ being smaller than 47.8 degree ($\theta<47.8°$). Thus, the possible re-emergence angle $\theta_{i2}$ is larger than 42.2 degree ($\theta_{i2}>42.2°$ degree).

(2) Prerequisite of the light to twice reflect in the cell configuration is $\phi>\theta$. However, $\theta_2=2\phi-\theta$, which means $\theta_2+\theta=2\phi$. Therefore, $\theta_2>\phi>\theta$. Accordingly, the light failing to exit after twice reflection in the cell configuration has no second chance to reach the emergence angle in the next cell configuration, which means it would be treated as the lost light.

According to the calculations and descriptions, the main parameters of the cell configuration 51 could be a ratio of L/H and the structural angle $\phi$. In one example, a ratio of H/L could be in a range of 0.1 to 0.15. The ratios of H/L could be adjusted according to the distribution of the cell configurations on the second light guide plate to meet the practical needs. During the design, the ratios of H/L of the cell configurations on the second light guide plate, for example, could be distributed from 0.05 to 0.2. But, the disclosure is not particularly limited to the ranges of H/L mentioned herein. In the optimization of the structural angle $\phi$ with a fixed value of H/L, the emergent light with the strongest energy is vertical to the emitting surface of the light guide plate after the incident light is twice reflected. In the calculation of the ratio of H/L ranged from 0.05 to 0.2, the preferable structural angle $\phi$ is in the range of 40 to 55 degree. Similarly, the disclosure has no particular limitation to the structural angle $\phi$ as the values mentioned herein. Also, the structural angles $\phi$ of all the cell configurations 51 could be identical or not entirely the same. Also, each cell configuration 51 might be symmetric ($\phi=\phi'$ of FIG. 5) or asymmetric ($\phi\neq\phi'$ of FIG. 5). The disclosure has no limitation thereto.

According to the aforementioned description, the liquid crystal display device of the embodiment adopts two sets of back light modules (BLUs), to provide the light for the display panel in the 2D and 3D display modes. The first and second BLUs are not turned on simultaneously. The combination of the polarizer and the pattern retarder of the embodiment functions as a parallax barrier for the LCD in the 3D display mode, which generates the transparent and opaque regions interlaced in an order to separate the light pathway of spatial images into images for left eye and right eye. This reconstructed scene of the left eye image and right eye image is perceived as 3D images by the observer. In the 2D display mode, the light from the related BLU completely penetrates the pattern retarder of the embodiment. Additionally, the BLU related to the 2D display mode could be further designed to include the cell configurations as described above, to conduct the incident light reflected twice in the light guide plate, thereby leading the light to exit from the front surface of the light guide plate (ex: the emergence angle as vertical as possible) and acquiring sufficient high light efficiency. Therefore, the liquid crystal display device of the embodiment possesses the function of switchable 2D and display modes, and is also fabricated with a lower cost compared to the conventional design with two display panels.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A liquid crystal display device, comprising:
a liquid crystal display panel;
a first back light module (BLU), disposed below the liquid crystal display panel for emitting light;
a polarizer, disposed on the first BLU, to convert the light from the first BLU into a first light;
a second BLU, disposed between the liquid crystal display panel and the first BLU for emitting a second light, the second BLU turned off when the first BLU turned on, and the second BLU turned on when the first BLU turned off; and
a pattern retarder, disposed between the liquid crystal display panel and the first BLU, the pattern retarder comprising a plurality of first polarizing regions and a plurality of second polarizing regions arranged in an interlaced order, and a polarization state of the first polarizing region being orthogonal to a polarization state of the second polarizing region.

2. The liquid crystal display device according to claim 1, wherein a polarization state of the first light is orthogonal to the polarization state of the second polarizing region.

3. The liquid crystal display device according to claim 1, wherein the second light is an unpolarized light.

4. The liquid crystal display device according to claim 1, wherein the polarizer comprises a quarter-wave retardation plate.

5. The liquid crystal display device according to claim 4, wherein the polarization states of the first polarizing regions and the second polarizing regions are circularly polarized and orthogonal to each other.

6. The liquid crystal display device according to claim 1, wherein the polarization states of the first polarizing regions and the second polarizing regions are linearly polarized.

7. The liquid crystal display device according to claim 1, wherein the pattern retarder is attached to the liquid crystal display panel, and the first polarizing regions and the second polarizing regions are positioned correspondingly to a plurality of pixel regions of the liquid crystal display panel.

8. The liquid crystal display device according to claim 1, wherein the second BLU comprises a second light guide plate and a second light source disposed at a lateral side of the second light guide plate.

9. The liquid crystal display device according to claim 8, wherein the second BLU comprises two of the second light sources disposed at two opposite lateral sides of the second light guide plate, respectively.

10. The liquid crystal display device according to claim 8, wherein the second light guide plate comprises a plurality of cell configurations distributed on a bottom surface of the second light guide plate, and each of the cell configurations is reversely trapezoidal-shaped.

11. The liquid crystal display device according to claim 10, wherein each of the cell configurations has a bottom portion, an opening portion, a first slanted surface and a second slanted surface connected to the bottom portion and the opening portion, the second slanted surface is farther from the second light source than the first slanted surface, and the opening portion joins the bottom surface of the second light guide plate.

12. The liquid crystal display device according to claim 11, wherein a vertical distance from the bottom portion to the opening portion is defined as a depth H of the cell configuration, the opening portion has a length L along a propagation direction of the second light, the second light has an incident angle $\theta$, and an exterior angle of the second slanted surface is defined as a structural angle $\phi$, when $$\theta \geq \tan^{-1}\left(\frac{H}{L - H \times \cot\phi}\right),$$

the second light exits the second light guide plate.

13. The liquid crystal display device according to claim 12, wherein a ratio of H/L is in a range of 0.05 to 0.2.

14. The liquid crystal display device according to claim 12, wherein a ratio of H/L is in a range of 0.1 to 0.15.

15. The liquid crystal display device according to claim 12, wherein at least parts of the cell configurations have different ratios of H/L.

16. The liquid crystal display device according to claim 15, wherein the cell configurations farther from an incidence surface of the second light guide plate have smaller ratios of H/L.

17. The liquid crystal display device according to claim 10, wherein the cell configurations distributed on the bottom surface of the second light guide plate are arranged in an order from sparse to dense in accordance of distances to the second light source.

18. The liquid crystal display device according to claim 10, wherein the cell configurations closer to the second light source are smaller in width, while the cell configurations farther from the second light source are larger in width.

* * * * *